United States Patent [19]
Wrobel et al.

[11] 3,968,942
[45] July 13, 1976

[54] MAGNETIC TAPE RECORDING AND/OR REPRODUCING APPARATUS

[75] Inventors: Günter Wrobel, Villingen; Georg Papst, St. Georgen, both of Germany

[73] Assignee: Papst-Motoren KG, Germany

[22] Filed: Oct. 21, 1974

[21] Appl. No.: 516,782

[30] Foreign Application Priority Data
Oct. 26, 1973   Germany............................ 2353856

[52] U.S. Cl.................................... 242/204; 74/207
[51] Int. Cl.²...................... G03B 1/04; G11B 15/32
[58] Field of Search .......................... 242/201–204; 74/206–210

[56] References Cited
UNITED STATES PATENTS

| | | |
|---|---|---|
| 2,676,212 | 4/1954 | Williams .......................... 242/201 X |
| 2,974,891 | 3/1961 | Waldhauer...................... 242/204 X |
| 3,133,710 | 5/1964 | Herterich............................. 242/201 |
| 3,211,014 | 10/1965 | Sanderson............................. 74/207 |
| 3,495,789 | 2/1970 | Gerfast ............................... 242/201 |
| 3,608,847 | 9/1971 | Hufford .............................. 242/204 |

*Primary Examiner*—Leonard D. Christian
*Attorney, Agent, or Firm*—James C. Wray

[57] ABSTRACT

A magnetic tape recorder has two electric motors only, one of which is arranged selectively to drive one or other of two winding hubs depending on the direction in which a magnetic tape is to be transported and the other of which drives a tape drive capstan. The first motor is disposed non-co-axially with the axes of the hubs and the second motor, which is flat in shape and has at least four pairs of poles, is disposed alongside and at the same level as the first motor.

19 Claims, 6 Drawing Figures

MAGNETIC TAPE RECORDING AND/OR REPRODUCING APPARATUS

BRIEF SUMMARY OF THE INVENTION

The invention relates to magnetic tape recording and/or reproducing apparatus.

Various drive means for apparatus of this kind are known. In the case of inexpensive tape recorder, preference is generally given to drive means which is powered by only one electric motor, whereas for tape recorders for particularly high-quality reproduction of music, drive means are preferred in which three electric motors are provided, one of which drives a tape drive capstan, whereas each of two winding hubs is driven by an associated additional electric motor.

The present invention aims at an embodiment of magnetic tape recording and/or reproducing apparatus wherein by simple constructional features and without appreciable additional expenditure, and therefore without any substantial increase in the production costs, a substantial improvement in the performance as well as a reduction of the overall dimensions of said apparatus is achieved.

According to the present invention there is provided magnetic tape recording and/or reproducing apparatus comprising: two tape winding hubs; a first electric motor for driving said hubs and having a drive shaft disposed non-coaxially with the rotational axes of said hubs; means for selectively coupling the drive shaft of said first motor to either one of said hubs depending on the required direction of movement of a magnetic tape; a tape drive capstan; and a second electric motor for driving said tape and having a drive shaft coaxial with and coupled to said capstan, said second motor being generally flat in shape, having at least four pairs of poles, and being disposed at substantially the same level and alongside said first motor.

Preferably the apparatus further comprising a first friction wheel driven by said second motor, second and third friction wheels coupled one with each said hub, and an intermediate friction wheel which is pivotable about the rotational axis of the first friction wheel, the arrangement being such that in the two end positions of its pivotal movement the intermediate wheel is in positive mechanical contact with one of said second and third friction wheels.

Advantageously, the diameters of said first, second and third friction wheels and the distances between the axis of the first friction wheel on the one hand and the axes of the second and third friction wheels on the other hand, and the diameter of said intermediate wheel are so selected that the angle between the two straight lines drawn through the axes of the coupled friction wheels on the one hand and through the axis of the intermediate wheel on the other is at least 110°.

This results in the advantage that, after the positive mechanical contact has been established, the coupling between the winding hub and the first motor can be automatically held even without continuance of a specific pressure-applying force, and contact in fact continues until the friction wheel is swung back again into the rest position by an additional force. Because of the small bearing-forces which still occur when the friction wheels are positively mechanically coupled during operation of the apparatus, the intermediate wheel is pulled in like a tapered plug between the first and second of the first and third friction wheel when the angle is great enough. If the angle were too small, the intermediate wheel would be thrown back in the initial stage of positive mechanical engagement, as will be clearly seen from the following description of the drawings.

Advantage accrues if a braking device, acting on the two winding hubs, is provided, which braking device is released only when current is supplied to at least the second motor. This is a simple but effective step for preventing unintentional unwinding in the rest position and any damage to the tape that may be caused thereby.

DESCRIPTION OF THE DRAWINGS

Embodiments of the invention will now be described by way of example with reference to the accompanying drawings, in which.

SPECIFICATION

Figure 1:
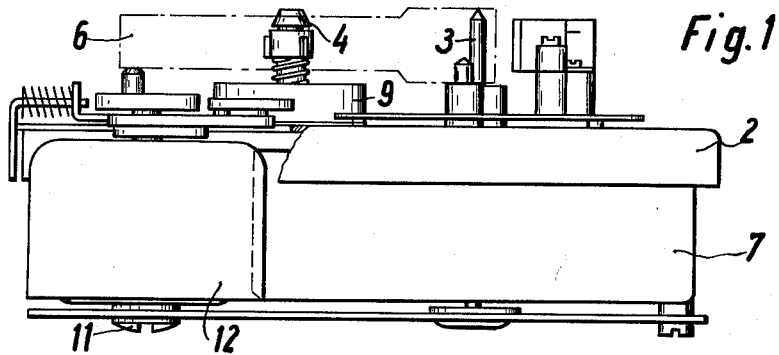
FIG. 1 is a side view of a magnetic tape recording and/or reproducing apparatus according to the invention, with parts not necessary for an understanding of the invention omitted.
Figure 2:
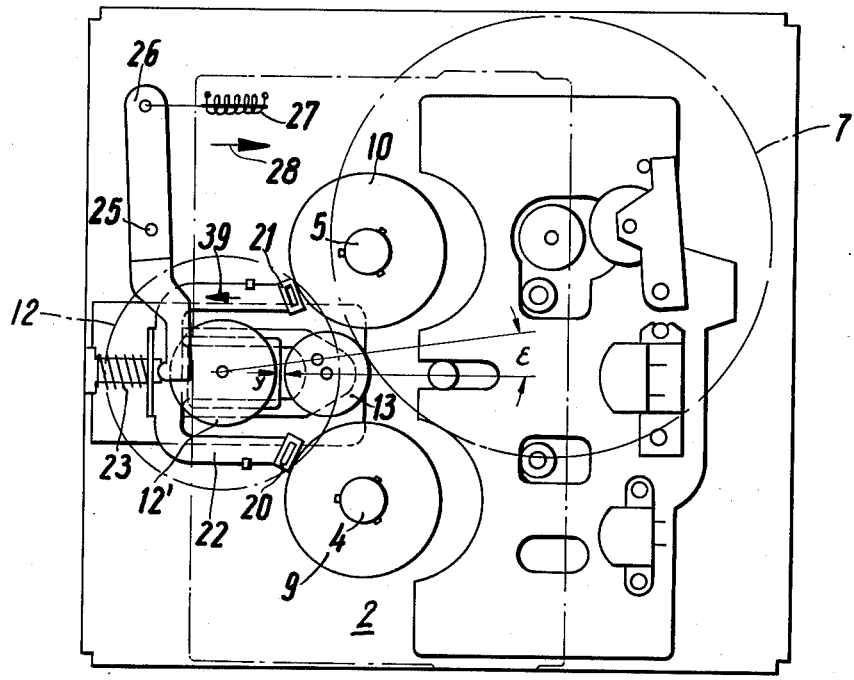
FIG. 2 is a plan view of the apparatus.

In FIGS. 1 and 2 is illustrated a magentic tape recording and/or reproducing apparatus 1 which has a box-like housing 2 from the top of which project a tape driving capstan 3 and two winding hubs 4 and 5. In the figures, a cassette 6 containing the magnetic tape is indicated by a chain-dot phantom line, and for the sake of greater clarity, some parts of the apparatus 1 have been omitted from FIG. 1.

Figure 3:
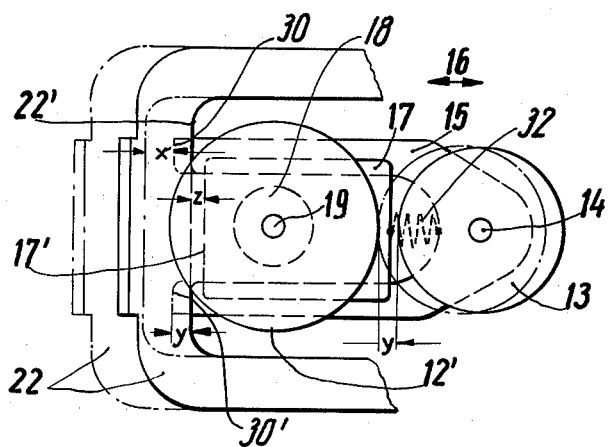
FIG. 3 is a plan view which shows, on a larger scale, a constructional detail of the apparatus.
Figure 4:
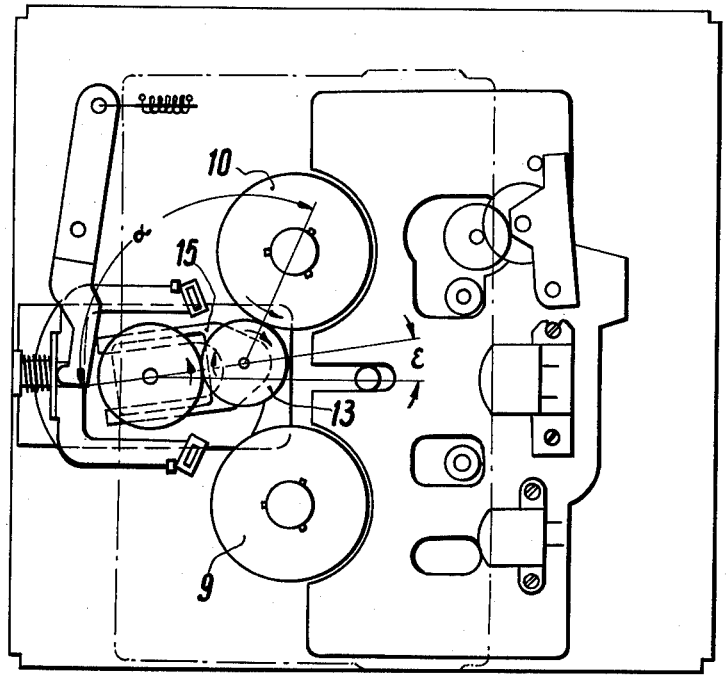
FIG. 4 is a plan view which shows the apparatus during play-back.

It will be seen from FIGS. 1 and 2 that with the cassette 6 fitted, the capstan 3 and the winding hubs 4 and 5 project into the cassette 6. The capstan 3 is a coaxial extension of the shaft of an electric tape drive motor 7, which is substantially flat in shape, having a diameter to length ratio of three to one, and is secured to the frame of the housing 2. The motor 7 has at least four pairs of poles and is preferably a 20-pole motor. It may be a hysteresis synchronous motor with an external rotor or a commutatorless direct current motor. The winding hubs 4 and 5 are mounted on the winding plates 9 and 10 which take the form of friction wheels and which are selectively driven by a pivotable intermediate wheel 13, which in turn is driven by a friction wheel 12' secured to the shaft of a winding motor 12 which can be of the same type as motor 7. The winding motor 12 is secured to the frame of the housing 2 with a screw 11. To achieve the pivoting movement, a pivot pin 14 of the intermediate wheel 13 is fitted on a stirrup 15 which is longitudinally displaceable in an intermediate member 17 in the directions indicated by the arrow 16. The intermediate member 17 is mounted to pivot about the shaft 19 of the winding motor 12, and the shaft 19 is disposed in the plane of symmetry between the rotational axes of the winding hubs 4 and 5. This is shown in FIG. 3. A sliding bearing 18 is inserted in the intermediate member 17 in order to reduce the friction of the intermediate wheel 13 to a minimum. With free play of the stirrup 15, a spring 32 pulls the intermediate wheel 13 on to the first friction wheel 12' until positive mechanical engagement is established. Also, brake blocks 20 and 21 are secured to the ends of a U-shaped brake fork 22 which, in the rest position and under the action of a spring 23 presses the brake blocks 20 and 21 against the winding plates 9 and 10 respectively, and at the same time, by pushing against the rear edges 30 and 30' of the intermediate member 17, first interrupts the positive mechanical engagement between the intermediate wheel 13 and the winding plate 9 or 10, while the intermediate member 17 pivots about the shaft 19, and then interrupts the engagement between the wheels 12' and 13, thereby overcoming the force of the spring 23. This is a constructionally very simple but effective step for preventing unintentional unwinding in the rest position and any damage to the tape caused thereby. This position of the brake blocks 20 and 21 is shown in FIG. 2. As indicated, the intermediate wheel 13 is disengaged by the fork 22 and is moved into its middle position.

Also provided is a double-arm lever 26 which pivots about a pin 25 and on which acts the force of the spring 23 in the rest position, whereas in the operating position, that is when the electric motors 7 and 12 are receiving current and an electro-magnet 27 is at the same time energised, the lever 26 is moved in the direction indcated by the arrow 28 against the force of the spring 23, and thus the projecting rear edges 30 and 30' of the stirrup 15 move to the left to follow the disengaged brake fork 22 (FIGS. 2 and 3) on account of the force applied by the spring 32, this movement continuing until the intermediate wheel 13 bears against the friction wheel 12'. Since, due to release of the brake fork 22 by means of the magnet 27, at least one of the winding plates 9 and 10 rotates, the stirrup 15, together with the intermediate wheel 13 bearing against the first friction wheel 12', receives an impulse in the direction of the rotation of the winding motor 12 through the small but nevertheless present bearing-friction forces and possibly also forces due to inertia, so that the intermediate wheel 13, as indicated, engages in a mechanically positive manner between the friction wheels 12' and the winding plate 9 or 10 at a wedge angle resulting in a clamping effect.

Upon changing to the rest position, that is when braking is initiated or when the current is interrupted, the intermediate wheel 13 should first be moved from the positively mechanically coupled position and then moved into the neutral position, and only then should the brake blocks 20 and 21 act on the winding plates 9 and 10 respectively. As already described, this occurs by the fork 22 first encountering a rear edge 30 or 30' then swinging the intermediate member 17 to the middle position and thereafter disengaging the intermediate wheel 13 from the friction wheel 12' by pushing the rear edged 30 and 30' against the action of the spring 32.

Consequently, during the braking operation by the brake blocks 20 and 21, virtually only the mass of the winding plate 9 or 10 is slowed down, and therefore the winding plate is slowed down rapidly.

Moreover, there is the further advantage that the friction surfaces are all uncoupled when stationary, that is, there is no positive mechanical contact, so that there is no risk of deformation.

Figure 5:
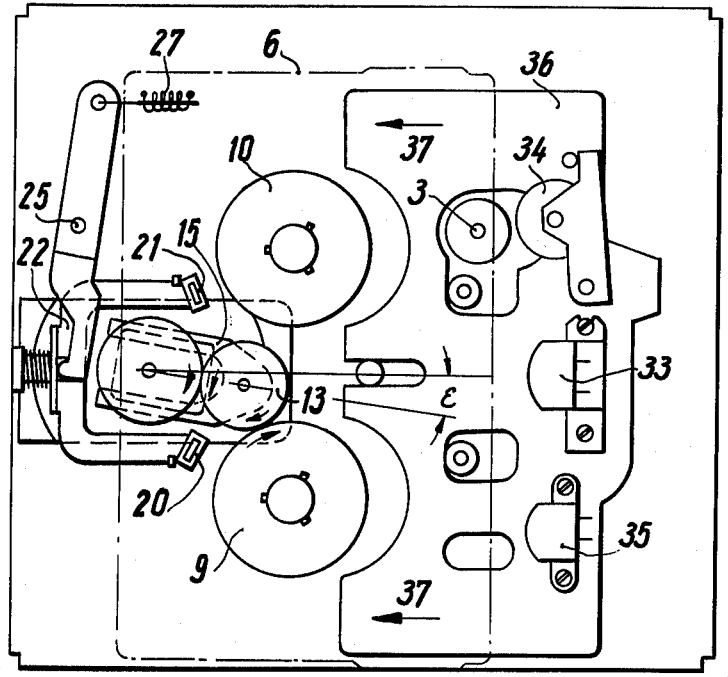
FIG. 5 is a plan view which shows the apparatus during rewinding.

To start up the apparatus 1, the cassette 6 is fitted over a magnetic recording and/or reproducing head 33 as enumerated in FIG. 5, and a magnetic head plate 36, carrying a pinch roller 34 and an erasing head 35, is moved in known manner in the direction indicated by the arrow 37, with the aid of an electro-magnet (not illustrated) against the force of a return spring, also not illustrated. When this happens, the magnetic tape is urged towards the capstan 3 by the pinch roller 34 and is ready to be played. The drive motor 7 which drived the capstan 3 is switched on at the same time as the apparatus is started up. The electro-magnet 27 is then energised by the application of pressure to the appropriate control button 12, and the intermediate member 17, hitherto prevented from pivoting by the lever 26, can now pivot about the shaft 19 of the winding motor 12. As a result of the winding motor 12 now beginning to turn in the direction concerned, the intermediate wheel 13 is pulled by the spring 32 and is pivoted through the corresponding angle $\epsilon$ and brought into engagement with the respective winding plate. The angle through which the intermediate member 17 can swing is $2\epsilon$. When the tape is moving rapidly forwards or backwards, the intermediate wheel 13 is moved into engagement in a similar manner and in a direction depending upon the direction in which the winding motor 12 is turning so as to provide for forward travel or reverse travel.

At the same time the U-shaped brake lever 22 is moved by the lever 26 in the direction indicated by the arrow 39, and the brake blocks 20 and 21 are thus disengaged from the associated winding plates 9 and 10 respectively. The tape can then be wound in the same manner as when a drive comprising three motors is used.

If the angle $\epsilon$ is too small, or because the intermediate wheel 13 may possibly be moved asymmetrically into the region of engagement, the intermediate wheel 13 may be rejected under some circumstances, so that in an unfavourable case the wheel does not come into appropriate engagement with the respective winding plate. Therefore a resilient auxiliary member may be provided, to assist in pushing the intermediate wheel 13 into engagement between the winding plate 9 and the wheel 12', or the winding plate 10 and the wheel 12', after moving out of the middle position (FIG. 2).

Figure 6:
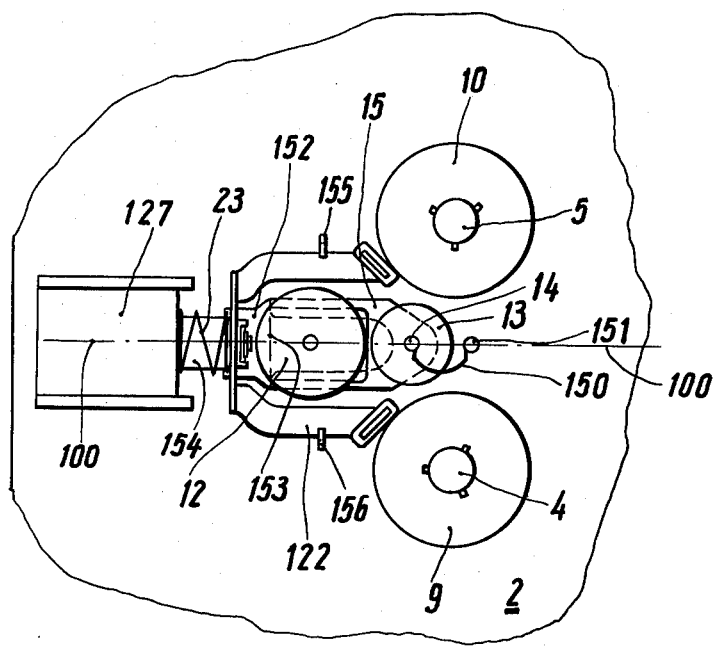
FIG. 6 is a modified form of the apparatus of FIG. 2, in the braking position.

For example, as shown in FIG. 6, this can be effected by a spring means in the form for example of a simple wire loop spring member 150 which at one end is fixed about a pin 151 disposed in the centre plane of symmetry, denoted by 100 in FIG. 6, between the winding hubs 4 and 5, on the base plate 2, while its other end is looped around the shaft 14 of the intermediate wheel 13. So that the intermediate wheel 13, in conjunction with the action of the spring member 150, will always turn through the pivotal angle $\epsilon$ in the desired direction, in its condition of disengagement from the plates 9 and 10, the intermediate wheel 14 must always lie in the centre plane of symmetry 100.

In the arrangement shown in FIG. 6, this is achieved, in contrast to the arrangement shown in FIG. 2. In FIG. 6 an angle member 152 is fixedly connected to the armature 154 of the electro-magnet 127. The member 152 has an abutment surface or edge 153 which is always at an angle of 90° to the plane 100. In FIG. 6 construction has a brake fork 122 which like the fork 22 in FIGS. 2 to 5, is movable along the plane 100. The fork 122 is guided laterally in small guide lugs 155 and 156 which are of substantially U-shape and engage about the sides of the fork 122. The lugs 155 and 156 can advantageously be bent up out of the base plate 2. A similar construction is also shown in FIGS. 2 to 5.

In the FIG. 6 construction, the electro-magnet 127 is arranged coaxially to the spring 23 which is thus carried by the armature 154. In this arrangement the lever 26 and its mounting are therefore not required.

FIG. 3 shows the positions of the brake fork 22 when the brake is off and when it is applied. The difference in the positions corresponds to the brake stroke $x$ and $y$. $y$ is the distance of travel of the stirrup 15 or the distance over which the intermediate wheel 13 moves away from the wheel 12'. The component $x$ is necessary to enable the stirrup 15 to pivot freely on the intermediate member 17 about the shaft 19, as far as is necessary. The maximum deflection movement is $\epsilon$, that is one of the rear edges 30 or 30' of the stirrup 15 must be at a minimum distance from the contact face 22' of the fork 22 for the greatest angle of swing $\epsilon$ required. When the brake blocks 20 and 21 are applied, the surface 22' should still not touch the rear edge 17' of the intermediate member 17, nor should it do so when the brake material is worn. The safety distance $z$ is therefore determined by the necessary manufacturing tolerances and the wear on the brake material.

If, in a direct drive motor, the resonance frequency $f_o$ of the rotor, besides the so-called rotary frequency $f_D$, preferably lies between the single rotary frequency and the double of the rotary frequency, excellent synchronism is achieved. The moment of inertia of the rotor, which also determines the frequency $f_o$, is to be attuned thereto by changes in weight on the rotor. The frequency $f_D$ in the case of a 20-pole motor ($p = 10$) is 5 Hz, when the main frequency $f_N = 50$ Hz. Generally, $f_D = f_{N/p}$.

The electric motor 7 in FIG. 1 has been described as being a motor with an external rotor. In such a motor, the rotor is a substantially bell-shaped member which rotates at the outside of the motor, with an outside diameter of 75 mm and an axial length of 25 mm. This motor has a resonance frequency in the range of 5 or 10 Hz, depending on whether the main mass of the rotor comprises a zinc alloy or an aluminum alloy. The frequency $f_o$ which also depends on the voltage applied to the motor should not be a multiple of $f_D$. Therefore, with a high-poled external-rotor direct drive motor, a heavy material, for example a zinc injection moulded alloy, is used for the rotor housing. There is no more difficulty in setting the resonancy frequency $f_o$ between $f_D$ and $2f_D$, than for example between $2f_D$ and $3f_D$, as in this case, with the above-mentioned housing dimensions and the nominal voltage $f_o$, already lies between 5 and 10 Hz, and the permissible over-voltage or under-voltage values will result in a respective $f_o$ value which is better related to $f_D/2f_D$ than to $2f_D/3f_D$.

The invention enables a two-motor apparatus to be produced that is compact and reliable in operation while using only simple means. The friction wheel mechanism operates automatically without a special relay and/or electro-magnet for changing the direction of the friction wheels, some components of the mechanism (for example the brake fork) being utilised to carry out different functions. This particular mechanism can of course also be used with advantage in apparatus other than cassette equipment.

Many possible modifications will become apparent from the foregoing without departing from the spirit of the present invention. However, the foregoing disclosure is presented in an illustrative sense rather than a limiting sense and the appended claims are relied upon to define the scope of the present invention.

We claim:

1. Magnetic tape recording and/or reproducing apparatus comprising in combination:
   two tape winding hubs;
   a first electric motor for driving said hubs and having a drive shaft disposed non-coaxially with the rotational axes of said hubs;
   means for selectively coupling the drive shaft of said first motor to either one of said hubs depending on the required direction of movement of a magnetic tape;
   a tape drive capstan;
   and a second electric motor for driving said tape and having a drive shaft coaxial with and coupled to said capstan, said second motor being generally flat in shape, having at least four pairs of poles, and being disposed at substantially the same level and alongside said first motor.

2. Apparatus according to claim 1 wherein the drive shaft of said first motor is disposed in the plane of symmetry between said rotational axes of said hubs.

3. Apparatus according to claim 1 further comprising a first friction wheel driven by said first motor, second and third friction wheels coupled one with each said hub, and an intermediate friction wheel which is pivotable about the rotational axis of the first friction wheel, the arrangement being such that in the two end positions of its pivotal movement the intermediate wheel is in positive mechanical contact with one of said second and third friction wheels.

4. Apparatus according to claim 3 wherein the diameters of said first, second and third friction wheels and the distances between the axis of said first friction wheel on the one hand and the axes of said second and third friction wheels on the other hand, and the diameter of said intermediate wheel are so selected that the angle between the two straight lines drawn through the axes of the coupled friction wheels on the one hand and through the axis of the intermediate wheel on the other hand is at least 110°.

5. Apparatus according to claim 1 further comprising a braking device which acts on both said hubs and is disengaged only when current is supplied to at least one of said motors.

6. Apparatus according to claim 5, comprising a fork and two brake blocks, one for each of said hubs, which brake blocks are rigidly secured to the fork, a first means to urge the brake blocks into the braking position, and a second means which disengages the brake blocks thereby overcoming the force of the first means.

7. Apparatus according to claim 6 wherein said first means is a spring and said second means is an electromagnet.

8. Apparatus according to claim 7 wherein said electro-magnet is connected to the circuit of said motors that it is energized at the same time as said motors.

9. Apparatus according to claim 3 further comprising brake means for engaging and disengaging the hubs, a stirrup which is longitudinally displaceable on an intermediate member pivotable about the drive shaft of said first motor, and the distance between the axis of said intermediate wheel and the axis of said first motor is thus variable, and a spring conected to the stirrup for pulling said intermediate wheel into positive frictional contact with the first friction wheel when the brake is disengaged.

10. Apparatus according to claim 9 wherein at the end of the braking stroke, completed when the brake is on, said intermediate member with the stirrup is brought into a middle position and said intermediate wheel is withdrawn from said first friction wheel.

11. Apparatus according to claim 1 of the preceding claims wherein said first motor is a hysteresis synchronous motor.

12. Apparatus according to claim 11 wherein said first motor is of the external rotor type.

13. Apparatus according to claim 1 wherein said first motor is a direct-current motor having no commutator.

14. Apparatus according to any one of the preceding claims wherein said second motor is a hysteresis synchronous motor with a large number of poles.

15. Apparatus according to claim 14 wherein said second motor is an external rotor motor with at least 16 poles.

16. Apparatus according to claimm 1 wherein said second motor is a commutator-less direct-current motor.

17. Apparatus according to claim 1 of the preceding claims wherein said second motor has a rotor whose resonance frequency $f_o$ lies between whole multiples of its rotary frequency $f_v$.

18. Apparatus according to claim 17 wherein said resonance frequency lies between $f_D$ and $2f_D$.

19. Apparatus according to claim 9 including a member rigidly secured to the armature of the electro-magnet, said member providing an abutment edge which is maintained perpendicular to said plane of symmetry, the abutment edge being operable to hold said stirrup in a central position independently of the position of said fork, and further including a spring means operatively connected between the axis of the intermediate wheel and a fixed part of the apparatus, for moving the intermediate wheel into positive frictional contact with the resepective one of said second and third wheels when the intermediate wheel leaves a middle position therebetween.

* * * * *